US010515125B1

(12) United States Patent
Lavergne

(10) Patent No.: US 10,515,125 B1
(45) Date of Patent: Dec. 24, 2019

(54) STRUCTURED TEXT SEGMENT INDEXING TECHNIQUES

(71) Applicant: The Thought & Expression Company LLC, McLean, VA (US)

(72) Inventor: Christopher E. Lavergne, McLean, VA (US)

(73) Assignee: The Thought & Expression Company LLC, McLean, VA (US)

( * ) Notice: Subject to any disclaimer, the term of this patent is extended or adjusted under 35 U.S.C. 154(b) by 335 days.

(21) Appl. No.: 15/660,645

(22) Filed: Jul. 26, 2017

Related U.S. Application Data

(60) Provisional application No. 62/366,698, filed on Jul. 26, 2016.

(51) Int. Cl.
G06F 16/93 (2019.01)
G06F 16/35 (2019.01)
G06F 16/38 (2019.01)
G06F 16/31 (2019.01)

(52) U.S. Cl.
CPC .......... *G06F 16/93* (2019.01); *G06F 16/316* (2019.01); *G06F 16/35* (2019.01); *G06F 16/38* (2019.01)

(58) Field of Classification Search
CPC ......... G06F 16/93; G06F 16/38; G06F 16/316
See application file for complete search history.

(56) References Cited

U.S. PATENT DOCUMENTS

2006/0248440 A1* 11/2006 Rhoads ................. G06F 16/951
715/236
2017/0140051 A1* 5/2017 Ball ...................... G06F 16/358

* cited by examiner

*Primary Examiner* — Loc Tran
(74) *Attorney, Agent, or Firm* — Fish & Richardson P.C.

(57) ABSTRACT

In some implementations, a system is capable of using natural language processing (NLP), machine learning, and classification techniques to improve the storage and retrieval of text segments within a structured text repository. Data indicating a text segment retrieved from an online resource is retrieved. Metadata associated with the online resource is obtained. One or more one or more semantic scores are determined for the text segment. One or more classification labels are assigned to the text segment based at least on the obtained metadata and the one or more determined semantic scores. The text segment is indexed within a structured text repository using the one or more assigned classification labels.

15 Claims, 12 Drawing Sheets

STRUCTURED TEXT SEGMENT INDEXING TECHNIQUES

CROSS-REFERENCE TO RELATED APPLICATION

This application claims the benefit of U.S. Provisional Application No. 62/366,698, filed Jul. 26, 2016, and titled "TAXONOMY-BASED QUOTE INDEXING TECHNIQUES," which is incorporated by reference in its entirety.

FIELD

The present specification generally relates to information retrieval systems, and more particularly, to searching and indexing repositories of text segments.

BACKGROUND

Databases represent organized collections of data that often include various objects such as schemas, tables, queries, reports, and views for organizing and representing information. The data within a database is typically organized to model aspects of reality in a manner that supports processes requiring information. For example, digital libraries store digital objects as electronic media formats and provide means for organizing, storing, and retrieving stored files and media contained within the library collection. In some instances, stored files can be obtained according to metadata associated with the digital objects (e.g., title, author, data type, etc.).

Digital objects can be stored locally, or access remotely via computer networks. For instance, digital objects associated with a digital library can be stored on a database, and accessed remotely using information retrieval systems such as a web search engine.

SUMMARY

In some implementations, a system is capable of using natural language processing (NLP), machine learning, and classification techniques to improve the storage and retrieval of text segments within a structured text repository. The system indexes text segments using a set of classification labels descriptive of attributes of terms and/or content associated with the text segments. Examples of classification labels can include a category of the content, e.g., "business," identifying information for the content, e.g., author, title, objects, or relevant topics for the content, e.g., politics, news, technology, etc.

The system determines multiple classification labels for each text segment to represent aspects that can be relevant for information retrieval and storage. As one example, the system determines classification labels to represent the type of content associated with a text segment, e.g., genre, author. As another example, the system determines classification to identify topics that are relevant to a text segment, e.g., content about a particular individual, themes/motifs identified within content, etc. As yet another example, the system determines classification labels to represent semantic and/or syntactic information within a text segment, e.g., connotations of terms included within a text segment, sentiments expressed within a text segment, etc.

The system stores each text segment within a text repository in association with multiple classification labels. In this regard, the system uses values of the multiple classification labels as different database indexes for the text repository. The system can use these database indexes to improve the performance of information retrieval from the text repository. The classification labels can be associated with specific taxonomies, e.g., specific classifications of terms, to improve the precision of responses provided in response to receiving queries submitted by users. As an example, the system can use the classification labels to sort text segments associated with American business individuals that are female and their thoughts/beliefs about a particular topic. The system can also use the classification labels can be included within hierarchies that are used to assist in disambiguation of information. For example, a text segment that is classified as being associated with education can be further classified based on the type of educational content included within the text segment, e.g., tutorial, informational, or evaluation.

The system can store data within the text repository in a structured format to improve the retrieval of relevant information as discussed above. For example, the system can identify different permutations of identical or similar values, e.g., different date formats, different location formats. In another example, the system may generate associations or relationships between different classification labels, e.g., classification labels that identify similar or complementary attributes, to make semantic inferences about content associated with a text segment classified by associated classification fields.

The system can classify text segments automatically, e.g., without human intervention, or based on receiving input from one or more users. In some implementations, the system classifies text segments based on a set of user-specified classification. For example, a user can manually specify classification labels for a book, such as genre, author, themes, etc., when entering a text segment that includes a quote from the book. Alternatively, in other implementations, the system classifies text segments based on applying machine learning and linguistic processing techniques to predict classification labels that are likely to be relevant to content associated with a text segment. For example, the system can predict classification labels that are likely to correspond to a text segment based on analyzing similarities in terms included in the text segment and terms included in pre-classified reference text segments. In some implementations, the system may use a combination of manual and automatic classification techniques discussed above.

The techniques described within this specification may provide one or more of the following technical advantages. Other advantages are discussed throughout the detailed description. The present technology improves resource allocation and, for example, the speed by which relevant text segments are retrieved from databases in response to receiving a user query such as a speech input requesting information about a particular topic. In response to receiving the user query, the system initially determines a set of classification labels that are relevant and/or responsive to the received query. The system uses the set of classification labels as search indexes to retrieve text segments that have been assigned to the classification labels. By using the classification labels as search indexes to obtain relevant data, the system reduces, for example, the number of database access queries needed to be run to obtain information responsive to the received search query. Additionally, classification labels can be arranged within a hierarchy and/or associated with certain predetermined attributes such that the retrieval of text segments using assigned classification labels as search indexes reduces and/or eliminates the necessity to use otherwise computationally-intensive processing techniques, e.g., semantic analysis, NLP, etc. to identify and retrieve textual information that is responsive or relevant to a received voice query.

In addition, the present technology reduces the storage space necessary to store sufficient information about a text segment to identify granular information about the text segment and/or content associated with the text segment. As discussed above, the system assigns a set of classification labels to each text segment, which then imparts a certain classification to each text segment the system can use to make inferences relating to the associations and relationships of text segments based on the assignment of classification labels. Such inferences can be made without requiring any additional information so that the system can reduce the overall amount of data required to, for example, use machine learning to identify text segments that a user is likely to find interesting based on a set of text segments he/she has previously interacted with. In this example, classification labels of the text segments associated with the user can be analyzed to identify other text segments that have been assigned to identical or similar classification labels. This prediction can be performed based on processing the classification labels of the text segments only and without processing content associated with the text segments, thereby reducing the total overall storage necessary to store comparison data.

The details of one or more implementations are set forth in the accompanying drawings and the description below. Other potential features and advantages will become apparent from the description, the drawings, and the claims.

Other implementations of these aspects include corresponding systems, apparatus and computer programs, configured to perform the actions of the methods, encoded on computer storage devices.

BRIEF DESCRIPTION OF THE DRAWINGS

Like reference numbers and designations in the various drawings indicate like elements. The components shown here, their connections and relationships, and their functions, are meant to be exemplary only, and are not meant to limit the implementations described and/or claimed in this document.

DETAILED DESCRIPTION

Figure 1A:
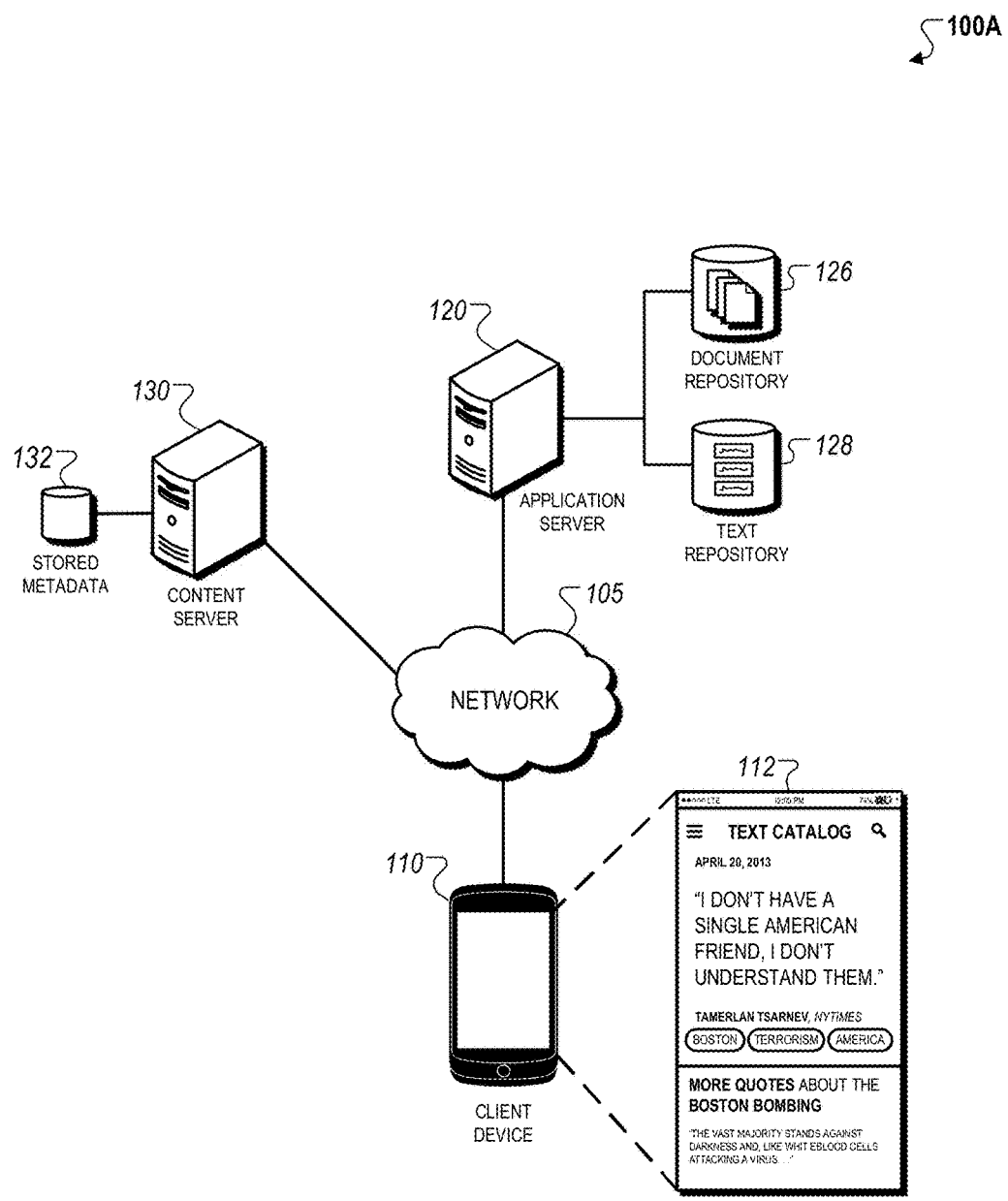
FIG. 1A is a schematic diagram that illustrates an example of a system that is capable of indexing a text segment within a structured text repository.

In general, a system is capable of using NLP, machine learning, and classification techniques to improve the storage and retrieval of text segments within a structured text repository. The system indexes text segments using a set of classification labels descriptive of attributes of terms and/or content associated with the text segments. Examples of classification labels can include a category of the content, e.g., business, identifying information for the content, e.g., author, title, objects, or relevant topics for the content, e.g., politics, news, technology, etc.

As described herein, a "text segment" refers to data that includes a sequence characters of readable material, e.g., plain text or rich text. A text segment can include a string of terms that forms a sentence, or any other suitable data format that represents a combination of linguistic units. In one example, a text segment represents a string of text corresponding to a quote extracted from an authored work such as an article, a book, or other type of publication. In this example, the text segment can represent a whole or partial portion of text or a partial portion of text. In other examples, a text segment represents any combination of terms that are retrieved and/or extracted from any online resource such as a webpage, a digital object, e.g., electronic book, or other types of documents accessible over the Internet.

As described herein, a "classification label" refers to a label, identifier, or identifier that is assigned to by a text segment. Each classification label can represent, for example, a different attribute that is determined to be descriptive or representative of the text segment. In one example, classification labels are assigned to a text query based on the attributes of terms included within the text query. In another example, classification labels are assigned to a text query based on content that is associated with the text query, e.g., a digital literary object from which the text segment is retrieved. Examples of attributes of the text query or syntactic represented by the classification labels include, but are not limited to, linguistic features and/or patterns, associated sentiments, semantic representations of text, among others as discussed in detail below.

As described herein, a "taxonomy" refers to a group of terms or text segments that share one or more classification labels. For example, two segments that are both assigned to a classification label can be referred to as being included in a taxonomy defined by the classification label. As discussed below, a term or a text segment can be included in multiple taxonomies based on its assigned classification labels. As an example, a text segment "read a book" retrieved from an instructional manual can be assigned to a classification label "EDUCATIONAL" based on the type of content included in the instruction manual, as well as classification label "SAFE" based on the lack of explicit terms within the text query. The text segment, in this example, can be included in two taxonomies, e.g., educational content and child-safe content.

In some implementations, a taxonomy can represent a collection of terms and/or text segments that share a particular attribute. In such implementations, a taxonomy can be used to identify terms that are likely to represent synonyms, or share a particular data format. Examples of such taxonomies can include "birthplace," "title," "setting, death," "publication date," etc.

As described herein, an "online resource" refers to any type of document or web location made available through the Internet and that includes text segments that are processed by the techniques described herein. As examples, an online resource can refer to a webpage that includes a text segment, an online content store that sells products that are associated with a text segment, an electronic document that includes a text segment, among others.

Each online resource can be associated with metadata, which includes data and/or information that identifies the online resource to the system that processes text segments. For example, metadata for an online resource that is an electronic book can include an author of the book, the title of the book, the Internet Blog Serial Number (IBSN), etc. As another example, metadata for an online resource that is a webpage can include a Uniform Resource Locator (URL) of the webpage. Metadata for an online resource can indicate an entity that is associated with the online resource such as a publisher or editor of an electronic work, an organization that manages a webpage, or a product seller or a manufacturer that advertises a product on an electronic content store.

FIG. 1A is a schematic diagram that illustrates an example of a system 100A that is capable of indexing a text segment with a structured text repository 128. The system 100A can include a computing device 110, an application server 120, and a content server 130 connected over a network 105. The application server 120 includes a document repository 126 and a text repository 128. The content server 130 stores metadata 132 in an associated repository.

In general, the computing device 110 can run an application, e.g., a mobile application, that displays an interface 112 on the screen of the computing device 110. A user can use the interface 112 to submit, store and search text segments such as quotes within the structured text repository 128. Documents such as books that are associated with text segments can be extracted and stored within the document repository 126. Metadata for the documents can additionally be extracted from the content server 130.

The network 105 may include, for example, one or more of the Internet, Wide Area Networks (WANs), Local Area Networks (LANs), e.g., Wi-Fi, analog or digital wired and wireless telephone networks, e.g., a public switched telephone network (PSTN), Integrated Services Digital Network (ISDN), a cellular network, and Digital Subscriber Line (DSL), Ethernet, Internet Protocol (IP) over broadband, radio, television, cable, satellite, or any other delivery or tunneling mechanism for carrying data. The network 105 may include multiple networks or subnetworks, each of which may include, for example, a wired or wireless data pathway. The network 105 may also include a circuit-switched network, a packet-switched data network, or any other network able to carry electronic communications (e.g., data or voice communications). For example, the network 105 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 105 may include one or more networks that include wireless data channels and wireless voice channels. The network 105 may also be a wireless network, a broadband network, or a combination of networks including a wireless network and a broadband network.

The computing device 110 can be any type of personal electronic computing device with processing and networking capabilities. For example, the computing device 110 can be one or more of a laptop computing device, a desktop computing device, a tablet computing device, a smart phone, or a smart wearable device.

In some implementations, the computing device 110 runs a mobile application that provides the interface 112 for output through a display of the computing device 110. In such implementations, the mobile application can be configured to exchange data communications, e.g., data relating to application services, with the application server 120 and the content server 130 over the network 105.

The application server 120 can be remote database server that stores data used to index a quote submitted by the user 102. The application server 120 may store a digital library 126 that includes a collection of digital objects associated with quotes previously submitted by users over the network 105. For example, each time a user submits a text query, a source digital object for a corresponding quote that is included in the digital library 126 can be added to the collection of digital objects to expand the predictive source recognition capabilities of the document identifier 150. In addition, the application server 120 may also store the quote repository 128 that includes a collection of quotes submitted by all users. Each quote that is added by a user is indexed within the quote repository 128 based on the metadata associated with a corresponding source digital object, and the user-specific classification labels as described previously. The application server 120 may also store metadata 132 associated with digital content that is available for purchase on an electronic content store (e.g., eBook library). In this example, the stored metadata 132 may include information provided by a publisher (e.g., IBSN, author, title, synopsis, etc.), as well as a uniform resource locator (URL) that indicates a web location of the corresponding digital object on the electronic content store.

In some instances, the quote repository 128 may consolidate stored records for multiple user submissions for the same quote. In such instances, data associated with each record (e.g., metadata of the source digital object and the user-selected classification labels) can be aggregated and stored in a single record within the quote repository 128. In this regard, multiple user submissions of the same quote can be clustered into a single record to improve the indexing capabilities of the quote repository 128.

In some implementations, the stored metadata 132 can be used to provide users with information for a digital object that includes a quote of interest for a user. For example, in response to receiving a search query for a topic of particular interest, indexing module 140 may initially identify quotes within the quote repository 128 that are determined to be responsive to the search query (e.g., based on identifying classification labels that are determined to be related to the received search query). The metadata extractor 160 may then crawl the stored metadata 132 to extract a web location that is associated with digital objects that include the quotes that are responsive to the search query. The identified web locations for the digital objects may then be provided as hyperlinks to the user. In this regard, the techniques described throughout can be used a mobile advertising platform where users that search the quote repository 128 can be directed to web locations to purchase content that is related to the submitted search query.

The content server 130 can be a remote server associated with an organization such as a publisher and/or retailer associated with the collection of digital objects. The content server 130 may store supplementary metadata associated with the collection of digital objects that is related to the stored metadata 132.

Figure 1B:
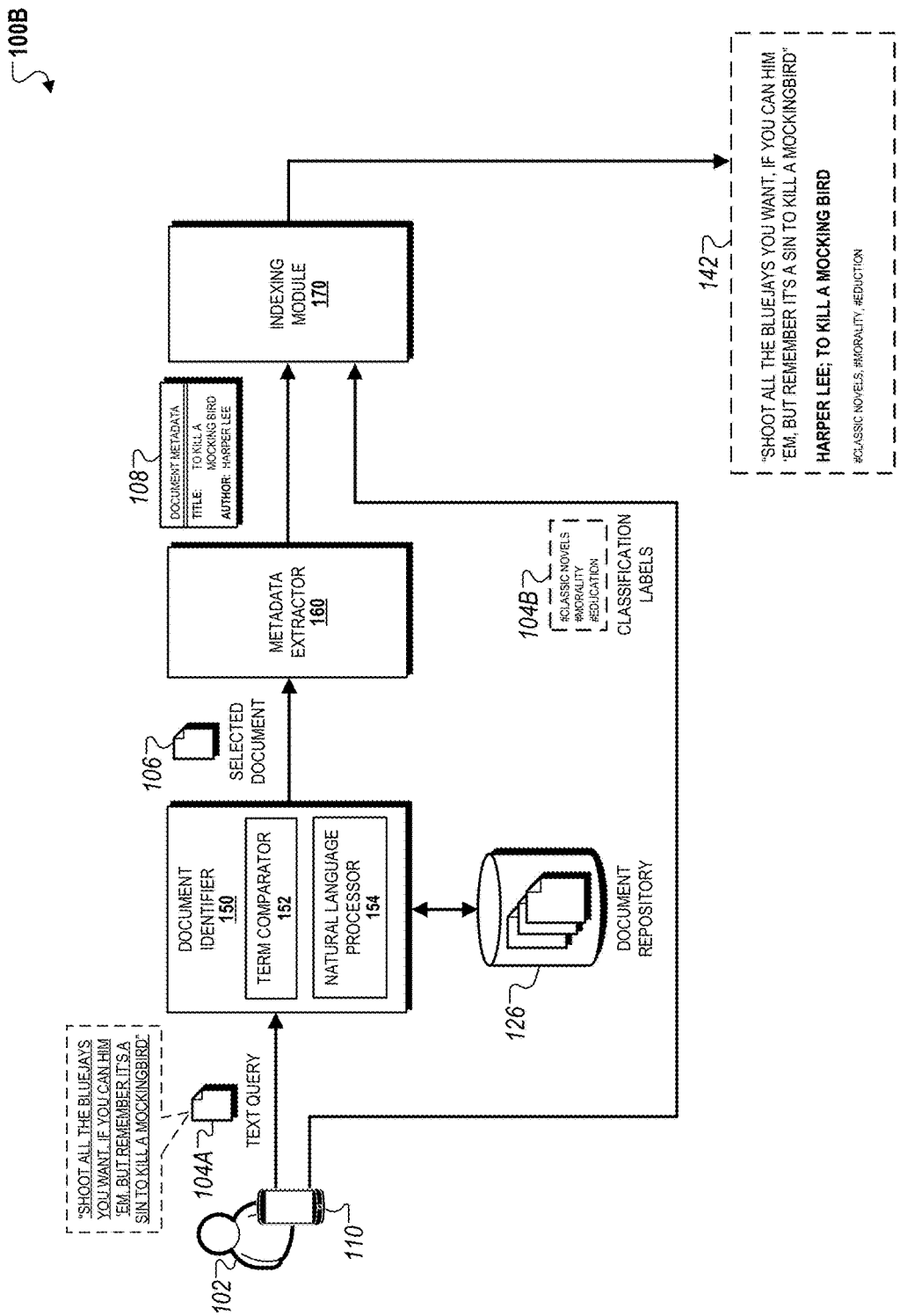
FIG. 1B is a schematic diagram that illustrates an example of a process for indexing a text segment within a structured text repository.

FIG. 1B is a schematic diagram that illustrates an example of a process 100B for indexing a text segment included in a query 104A within the structured text repository 128. The process 100A is executed by a document identifier 150, a metadata extractor 160, and an indexing module 140. The components depicted in FIG. 1B can be implemented and/or configured to run on the application server 120, the content server 130, the computing device 110, or a combination thereof.

In an exemplary operation, a user may use the mobile application to submit a text query (e.g., the query 104A as described in FIG. 1B) on the interface 112. The query can identify a text segment that is retrieved from an online resource. In response, the mobile application may exchange communications with the application server 120 and the content server 130 to identify the source digital object that includes the text segment identified within the text query and metadata associated with the source digital object. In other implementations, the interface 112 may instead be presented on a webpage through a browser application running on the computing device 110.

The process 100B can be used to automatically process a query 104A received from a computing device 110 associated with a user 102. The query 104A can be indexed within a quote repository 128 stored on the application server 120. The query 104A is initially processed by a document identifier 150, which compares the terms included within the query 104A to terms included within a digital library 126 that includes a collection of digital objects. A digital object is that is determined to include the quote is then selected and transmitted to the metadata extractor 160. Metadata 108 extracted from the digital object 106 is then transmitted to the indexing module 140. The indexing module 140 then organizes and stores the data associated with query 104A, e.g., the metadata 108 and classification labels 104B within the quote repository 128.

In more detail, the query 104A includes at least a portion of a quote that is extracted from a digital object such as an electronic book, a webpage, or some other type of electronic multimedia content. In the example depicted in the FIG., the query 104A includes an excerpt from the novel "To Kill a Mocking Bird," by Harper Lee.

In some instances, the user 102 may submit the query 104A on the computing device 110 by inserting a text segment using a 'paste' command into a text field box on a user interface provided for display on the computing device 110. In such instances, the document identifier 150 may determine whether the pasted text segment includes an identifier that is associated with a particular digital electronic library and/or content store in which the digital object was made available for the user. The document identifier 150 may then use the identifier within the text segment to automatically obtain information associated with the digital object that includes the text segment identified within the query 104A such the metadata 108.

Additionally, or alternatively, the user 102 may submit the query 104A on the computing device 110 by either typing the text segment into the text field box, or pasting the text segment from another source that is not associated with a digital electronic library (e.g., from an email or a word processing application). In such instances, the query 104A may initially be parsed by a natural language processor 154 to identify individual terms that are included within the query 104A. The natural language processor 154 may additionally use various computational linguistics techniques to compute a set of statistical parameters used to indicate a respective likelihood that a particular digital object within the digital library 126 is the source digital object that includes the quote associated with the query 104A.

In addition, the document identifier 150 may also include a term comparator 152 which determines the frequencies with which individual terms within the query 104A are present within each of the digital objects within the digital library 126. For example, the term comparator 152 may identify specific terms within the query 104A that are determined to be distinctive terms based on a language model that identifies respective probabilities associated with a collection of terms for a particular language. The term comparator 152 may then search for the presence of the distinctive terms from the query 104A within individual digital objects within the digital library 126 in order to determine the source digital object associated with the quote of the query 104A.

Using the techniques described above, the document identifier 150 then selects a particular digital object from among the collection of digital objects within the digital library 126 as the source digital object 106, and then transmits the source digital object 106 to the metadata extractor 160. The metadata extractor 160 identifies the metadata 108 associated with the source digital object 106. In some instances, the metadata 108 can be obtained from a server associated with the content publisher. For example, if the digital object is available for purchase within an electronic content store, the metadata extractor may obtain the metadata from the content publisher. Additionally, or alternatively, the metadata 108 may also be embedded within the file of the source digital object 106. In such instances, the metadata extractor 160 may extract the metadata 108 directly from the file stored within the digital library 126.

The indexing module 140 then indexes the text segment included within the query 104A using the extracted metadata 108 and the user-defined classification labels 104B. For example, as depicted respect to FIG. 2A, after submitting the query 104A on a user interface, the user 102 may also specify classification labels that are descriptive of topics or themes that relate and/or describe the quote included within the text query 104B. In the examples depicted in FIG. 1, the classification labels 104B include a classification label that identifies the type of literary work associated with the source digital object (e.g., "#CLASSIC NOVELS"), another label that identifies a literary theme reflected within the quote (e.g., "#MORALITY"), and finally, a label that identifies a topic that is related to the quote (e.g., "#EDUCATION"). In this regard, each of the classification labels 104B reflect different classification schema for a single quote within the query 104A.

The text segment corresponding to the quote within the query 104A can be indexed according to a user-specific classification configured by the user 102. For example, as depicted in FIG. 2B, the system 100A may store a user profile associated with the user 102 that organizes and stores quotes previously submitted by the user 102. The quotes can be organized according to the metadata obtained from the source digital object 106 (e.g., sorted by author/communicator), or by the user-defined classification labels provided by the user 102a when the query 104A is submitted. In this regard, if a user provides text query for a new quote with a pre-exuding classification label, then the indexing module 140 associates the new quote with the pre-existing classification label and then indexes the new quote according to the existing classification associated with the user's profile. Alternatively, if a user provides a text query with a new quote and new classification labels, then the indexing module 140 may instead adjust the existing classification associated with the user by adding the new classification labels within the user profile.

Figure 2:
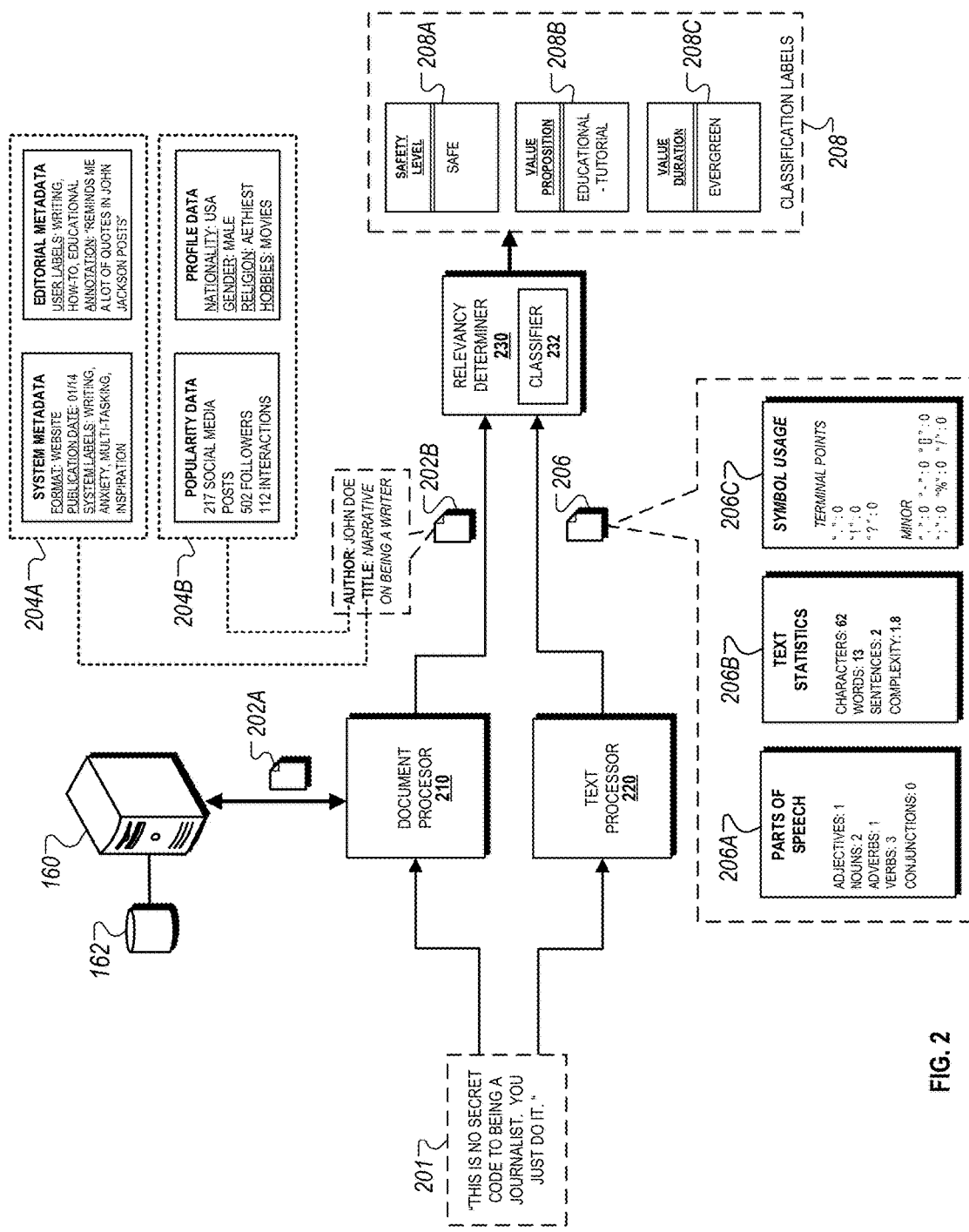
FIG. 2 is a schematic diagram that illustrates an example of a process for using NLP techniques to identify and classify content associated with text segments.

FIG. 2 is a schematic diagram that illustrates an example of a process 200 for using NLP techniques to identify and classify content associated with text segments. The process 200 can executed by a document processor 210, a text processor 220, and a relevancy determiner 230, which includes a classifier 232.

The components depicted in FIG. 2 can be software modules that are implemented and/or configured to run on the application server 120, the content server 130, the computing device 110, or a combination thereof. In one example, the document processor 210, the text processor 220, and the relevancy determiner 230 are software modules that run on the application server 120. In another example, one or more of these components, such as the document processor 210 or the text processor, can run locally on the computing device 110.

In the example depicted in FIG. 2, the system 100A processes two sources of information associated with a text segment 201 to automatically identify and assign a set of classification labels 208. The first source of information relates to document information associated with an online resource that includes the text segment 201, e.g., a document that includes the text segment 201. The second source of information relates to the contents of the text segment 201, e.g., terms included within the text segment 201. In some implementations, the system 100A may process other types of information that are associated with the text segment 201. For example, the system 100A may cluster user-submitted information for the text segment 201 from a collection of users to assign the classification labels 208.

To classify the text segment 201, the system 100A makes predictive inferences on attributes associated with the text segment 201 using, for example, NLP techniques to linguistically parse the contents of the text segment 201, e.g., terms included in the query, to develop semantic understanding of the text segment 201. The system 100A can additionally make predictive inferences by analyzing content associated with the text segment 201, e.g., metadata associated with the author of a quote identified within the text segment 201 and/or metadata associated with a document that includes the identified quote. The system 100A uses the predicted attributes to determine the classification labels 209 that are likely to be relevant to the classification of the text segment 201. In this regard, the system 100A can execute the process 200 to automatically classify the text segment 201, e.g., without human intervention.

In more detail, the document processor 210 processes and analyzes content that is associated with the text segment 201 such as a document or other online resource that includes the text segment 201. The document processor 210 accesses the stored metadata 132 on the content server 130 to obtain metadata 202A that is relevant to online resource of the text segment 201. In the example depicted in FIG. 2A, the metadata 202A identifies an author of a quote included within the text segment 201 and a title of an article that includes the quote. In other examples where the text segment 201 is not an authored work, the metadata can identify, for instance, a Uniform Resource Locator (URL) for a webpage that includes the text segment 201, or a product associated with the text segment 201 that is sold on an electronic content store, or other types of information associated with an online resource.

In the example depicted in FIG. 2, the extracted metadata 202B includes an author of the quote identified within the text segment 201, and a title of a document that includes the identified quote. The metadata 202B also includes known information associated each with the author and the title that is retrieved from the stored metadata 132. For example, the metadata 202B includes document data 204A, which includes "SYSTEM METADATA" and "EDITORIAL METADATA," and author data 204B, which includes "POPULARITY DATA" and "PROFILE DATA."

The document data 204A identifies document attributes that can be used by the text processor 220 and/or the relevancy determiner 230 to make predictive inferences on the attributes associated with the text segment 201, which can then be used to classify the text segment 201. For example, "SYSTEM METADATA" includes system labels that are assigned to the document based on, for example, the overall content of the document, e.g., themes, motifs, narrative structure, or based on other text segments that were previously processed and/or analyzed by the system 100A. As an example, the system label "WRITING" identifies a topic of the text segment 201, e.g., the focus of the text segment is on writing ability. As another example, the system label "ANXIETY" identifies an emotional attribute of users that would find the text segment 201 useful or beneficial, e.g., users that are anxious about their writing ability would be likely to find the quote within the text segment 201 useful or beneficial.

The "EDITORIAL METADATA" includes data or information provided by users that have previously accessed the document that includes the text segment 201. For example, the user labels can be used to indicate user-specified classification labels that the users have submitted to the system 100A to classify either the text segment 201, the document, or other related text segments within their personal text repositories. The "EDITORIAL METADATA" also includes comments provided by users that have previously interacted with the document and/or the text segment 201. The system can process the comments to predict an effect of the text segment on users based on inferences derived from user comments from prior interactions. In the example depicted in FIG. 2, the comment "REMINDS ME A LOT OF QUOTES IN JOHN JACKSON POSTS" can be used by the system 100A to infer that text segments associated with the communication "JOHN JACKSON" are likely to be relevant to the text segment 201.

The author data 204B identifies individual attributes that can similarly be used by the processor 220 and/or the relevancy determiner 230 to make predictive inferences on the attributes associated with the text segment 201. For example, the "POPULARITY DATA" includes a set of metrics that represents a social media presence of the author "JOHN DOE." The set of metrics includes a number of social media posts that the author has recently made, the number of followers that the author has, and a total number of interactions that involve the author. The set of metrics identified within the "POPULARITY DATA" can be used to predict, for example, a number of users that are likely to access the text segment 201, e.g., based on the number of followers for the author, a likelihood that the text segment

201 will be widely distributed amongst a population of users, e.g., based on a number of social media posts and/or interactions associated with the author, among other types of predictive inferences.

The "PROFILE DATA" includes information about the author, which can be used to predict the types of users that are likely find the author's literary work useful or enjoyable, for instance. As shown, the "PROFILE DATA" can identify demographic information such as a nationality, a gender, as well as other types of characteristics a religion and hobbies. In some implementations, the "PROFILE DATA" can additionally, or alternatively, include marital status, education institutions, net worth, among others. The information identified within the profile is used by the system to associate author attributes to the document, which are then associated with the text segment 201 for classification purposes.

The text processor 220 processes and analyzes the contents of the text segment 201 such as the terms that are included within the text segment 201, the sentence structure of the text segment 201, and/or the presence of certain symbols and/or characters. The text processor 220 uses NLP techniques to generate text analysis data 206. The text analysis data 207 can include semantic scores 206A, 206B, and 206C that are computed by the text processor 220 to represent different linguistic or syntactic attributes of the text segment 201.

Semantic scores 206A include scores representing the number of different parts of speech that are identified within the text segment. In the example depicted in FIG. 2, the semantic scores indicate that there are two adjectives included within the text segment 201, e.g., "SECRET," two nouns included within the text segment 201, e.g., "CODE," "JOURNALIST," one adverb, e.g., "JUST," three verbs, e.g., "IS," "BEING," DO," and no conjunctions.

Semantic scores 206B include scores representing different statistical metrics that are computed for the text segment 201. The statistical metrics can include summary statistics such as the number of characters that are included in the text segment 201, the number of words that are included in the text segment 201, and the number of sentences in the text segment 201. Additionally, the statistical metrics can also include analytical statistics such as, for example, a linguistic complexity score representing a determined linguistic complexity for the text segment 201. The analytical statistics can be based on, for example, sentence structure, e.g., number of dependent clauses and independent clauses, complexity of vocabulary used in the text segment 201, among other types of indicators.

Semantic scores 206C include scores representing the number of special characters that are identified within the text segment. Examples of special characters include terminal points such as ".", "!", and "?", which represent an end of a sentence or clause. Other examples of special characters include non-alphanumeric characters such as characters used to denote grammatical conventions, or symbols that do not contribute to linguistic attributes.

In some implementations, the presence of special characters within the text segment 201 can be used to identify, for example, various types of non-linguistic indicators. For example, the identification of ellipses can be used to determine continuity of phrases or sentences. As another example, the identification of quotation marks can be used to determine the presence of dialog or quotations. As yet another example, the identification of exclamation marks after a sentence can be used to identify emphasis and/or emotion conveyed through text by an author of the text segment 201. In such implementations, the non-linguistic indicators can be used in combination with NLP techniques to improve the classification of a text segment. For example, the identification of quotation marks and exclamation marks combined with the presence of terms that are associated with positive connotations can be used to assign classification labels "INTERACTION" and "ENTHUSIASTIC." In this example, the first classification label can be assigned based on the presence of dialogue within the text segment 201 whereas the second classification can be assigned based on the positive connotation associated with terms that are included in the text segment.

The relevancy determiner 230 uses the metadata 202B extracted by the document processor 210 and the text analysis data 206 generated by the text processor 210 to assign classification labels 208 to the text segment 201. The relevancy determiner 230 includes a classifier 230 that is trained to classify the text segment 201 based on a set of attributes, e.g., linguistic or syntactic attributes associated with the text segment 201, document attributes associated with the document that includes the text segment 201, individual attributes associated with the author that wrote the text segment 201.

In the example depicted in FIG. 2, the relevancy determiner 230 assigns values for three classification labels 208A, 208B, and 208C based on the processing and analyzing the contents of the metadata 202B and the text analysis data 206. In this example, each classification label can be used to associate a different type of predictive inference made by the system 100A in association with the text segment 201. For example, the classification label 208A can be used as a safety indicator that represents the explicitness of the text segment, e.g., "SAFE," "MODERATE, "EXPLICIT." The classification label 208B can be used as a content classification that represents a type of content that is represented in the text segment 201, e.g., "EDUCATIONAL," "INSPIRATIONAL," "ENTERTAINING," or "INAPPLICABLE." The classification label 207C can be used as a duration metric that represents a predicted duration of time during which the text segment 201 is predicted to be accessed by a threshold number of users, e.g., "EVERGREEN" (long period of time), or "EPHEMERAL" (short period of time).

In this example, the relevancy determiner 230 assigns the values of the classification labels 208A-C based on selecting a particular value from each from among multiple alternative values that can be assigned for each classification label. For example, the classification label "SAFETY LEVEL" can be assigned a value from among "SAFE," "MODERATE," or "EXPLICIT." As another example, the classification label "VALUE PROPOSITION" can be assigned a value from among "EDUCATIONAL," "INSPIRATIONAL," "ENTERTAINING," or "INAPPLICABLE." As yet another example, the classification label "VALUE DURATION" can be assigned a value of "EPHEMERAL" or "EVERGREEN." The assignment and structure of classification labels are discussed in detail below with respect to FIG. 3.

Although in the example depicted in FIG. 2 illustrates the assignment of values to different classification labels, in some implementations, the relevancy determiner 230 additionally, or alternatively, determines whether to assign a classification label with a fixed value to the text segment 201. In such implementations, the classifier 232 determines if a classification label should be assigned to the text segment 201 based on training data containing observations associated with the classification labels. The training data can specify a set of known attributes for each classification label that are can be used by the classifier 230 to determine if one or more attributes associated with the text segment 201 are included within the set of known attributes. For example, a classifier 230 can determine that the text segment 201 should be assigned to a certain classification label if the number common attributes between the certain classification label and the text segment 201 exceeds a threshold number.

In some implementations, attributes can be weighted such that certain attributes represent strong indicators of similarity and/or relevancy whereas other attributes represent weaker indicators of similarity and/or relevancy. In such implementations, the classifier 232 may determine that the text segment 201 should be assigned a certain classification label if the text segment 201 has an attribute that is determined to be a strong indicator of similarity and/or relevancy.

In some implementations, the training data can include user-submitted classification data that identifies text segments that have been manually classified with classification labels. Additionally, the training data user to perform classification can be periodically updated such that the classification techniques applied by the classifier 232 reflect changing patterns of, for example, online user behavior, topics that are presently of interest to users.

Figure 3:
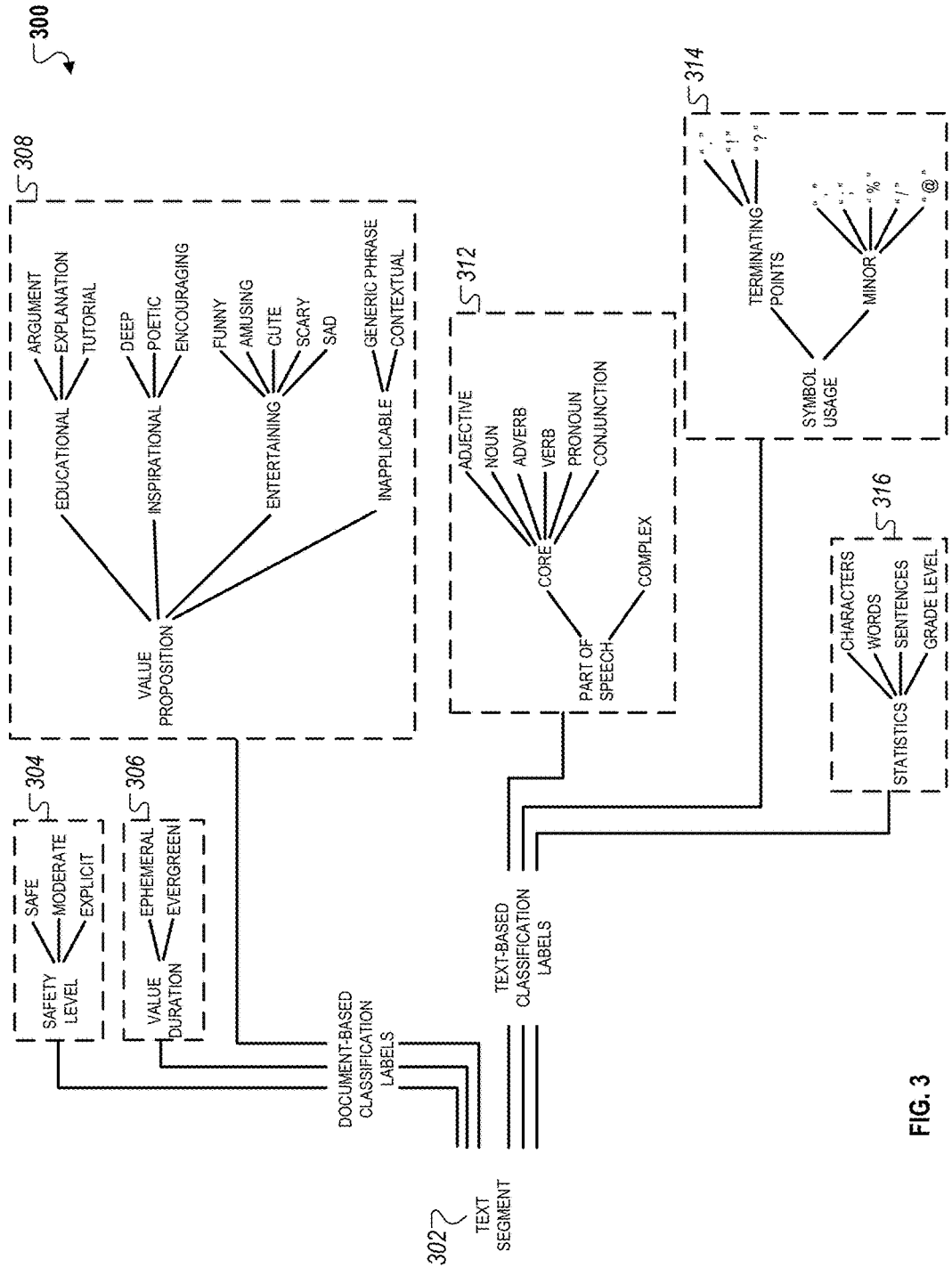
FIG. 3 is a schematic diagram that illustrates an example of a hierarchal classification structure for indexing text segments within a text repository.

FIG. 3 is a schematic diagram that illustrates an example of a hierarchal classification structure 300 for indexing a text segment 302 within a structured text repository such as the structured text repository 128 depicted in FIG. 1A. The classification structure 300 generally includes two types of classification labels. The first type of classification labels refers to document-based classification labels, which includes classification labels 304 and 306 and a classification hierarchy 308. The second type of classifications labels refers to text-based classification labels, which includes a classification label 312 and classification hierarchies 312 and 314.

The classification labels within the structure 300 can each have different properties depending on the classification attribute they are designed to represent. For example, the classification labels 304 and 306 represents categorical classifications that can only be assigned a single value from among multiple values. In contrast, classification label 316 represents a summary classification that is assigned multiple values that each represent the identified occurrence of a particular linguistic attribute within the text segment 202. Additionally, the classification hierarchy 312 represents an inclusiveness classification that represents can be assigned multiple values from among a group of values based on the attributes of the text segment 302 and/or the attributes of the document that includes the text segment 302. For example, the classification hierarchy 308 can be assigned values of "EDUCATIONAL" and "ENTERTAINING" if the text segment 302 is determined to have attributes that are inclusive of both types of classification labels.

In the example depicted in FIG. 3, values of document-based classification labels can be assigned based on metadata of an online resource from which the text segment 302 is retrieved, e.g., a webpage, an electronic book, an electronic content store, etc. For example, as discussed above with respect to FIG. 2, metadata associated with a document that includes the text segment 302 can include a set of attributes, e.g., document attributes, author attributes, which are then used to infer attributes about the text segment 302. The inferred attributes are then used to assign values to each classification label. As an example, if the document that includes the input text 302 includes explicit content, then the value assigned to the classification label 304 is "EXPLICIT." As another example, if the document that includes the input text 302 is a news article that is relevant only for a short period of time, then the value assigned to the classification label 306 is "EPHEMERAL" (or short period of time).

Text-based classification labels can be assigned on the based on linguistic or syntactic attributes of the text segment 302. For example, as discussed above with respect to FIG. 2, such attributes of the text segment 302 can include terms included, parts of speech present, linguistic complexity, sentence structure and arrangement, etc. These attributes are analyzed to compute semantic scores that represent either summary statistics, e.g., a number of different parts of speech within the text segment 302, or analytical statistics, a linguistic complexity score representing a determined linguistic complexity for the text segment 302.

As shown in FIG. 3, certain classification labels, and values assigned to them, can be structured in a hierarchal fashion such that a value assigned to a higher-level classification label represents a lower-level classification that also has its own value. For example, classification hierarchy 308 includes a higher-level classification label "VALUE PROPOSITION" can be assigned to a value "INSPIRATIONAL," which also represents a lower-level classification label with a value "DEEP." In this example, the multiple hierarchal classification labels enable the system 100A to generate granular classification information for each text segment.

Figure 4:
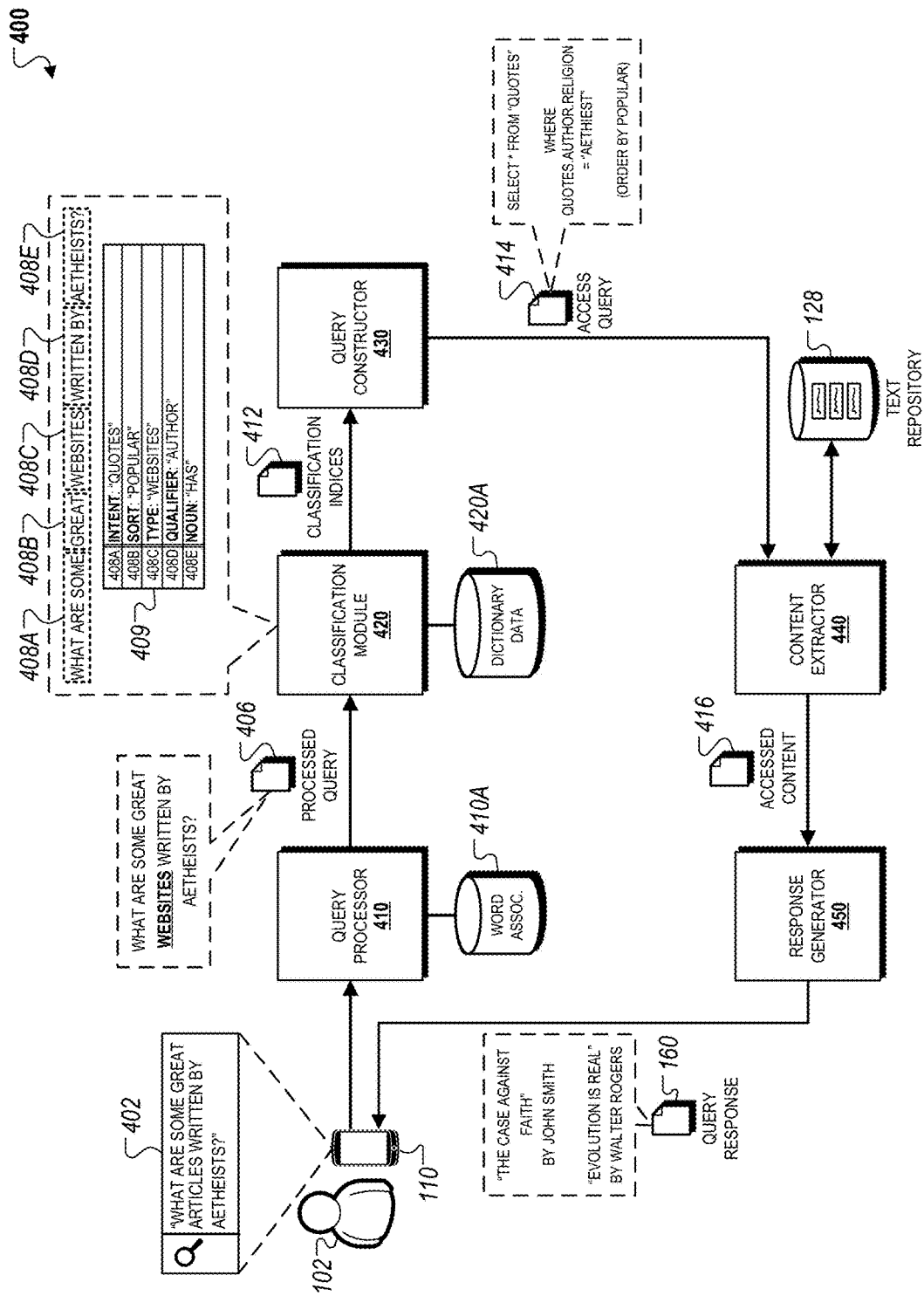
FIG. 4 is a schematic diagram that illustrates an example of a process for accessing a structured text repository to provide responses to queries submitted to by users.

FIG. 4 is a schematic diagram that illustrates an example of a process 400 for accessing a structured text repository to provide responses to queries submitted to by users. The process 400 can be executed by a query processor 410, a classification module 420, a query constructor 430, a content extractor 440, and a response generator 450.

The components depicted in FIG. 4 can be software modules that are implemented and/or configured to run on the application server 120, the content server 130, the computing device 110, or a combination thereof. In one example, the query processor 410, the classification module 420, the query constructor 430, the content extractor 440, and the response generator 450 are software modules that run on the application server 120. In another example, one or more of these components, such as the query processor, can run locally on the computing device 110.

In the example depicted in FIG. 4, the system 100A receives a query 402 that includes a request for information provided the user 102 using the computing device 110. The system 100A processes the query 402 to identify a request for information. The system 100A generates a set of search indices 412 that are then used to identify and retrieve relevant information stored within a structured text repository such as the repository 128. The retrieved information is then provided for output to the user 102 as a response 160 to the query 402.

Although a text query is depicted in FIG. 4, in some implementations, the system 100A is capable of processing other types queries. For example, the system 100A may be capable of processing audio data encoding a spoken input provided by the user 102. In such implementations, the system 100A may be capable of using speech recognition techniques to transcribe a voice query, and capable of text-to-speech (TTS) techniques to provide a speech output of the response 160 in response to the voice query. Additionally, the voice query can be submitted through different types of devices other than the computing device 110. For example, the voice query can be provided to a personal assistance device or any other type of device that is capable of using automated speech recognition (ASR) techniques to process the audio data.

A query processor 410 receives the query 402 and processes its contents using a word association data 410A. The query processor 410 transforms the query to increase the likelihood of identifying relevant information within the structured text repository 128. For example, in the example depicted in FIG. 4, the query processor 410 broadens the query to replace the term "ARTICLES" with "WEBSITES" to increase the number of text segments that can be provided in response to the voice query 402. In this example, the query processor 410 uses the word association data 410A to determine that, in the context of the voice query 402, the adjustment from "ARTICLES" and "WEBSITES" does not substantially adjust the nature of the request since the user 102 is interested in content written by atheists.

The query processor 410 can perform other types of transformations to increase the likelihood of identifying relevant information within the structured text repository 128. For example, the query processor 410 can identify and replace informal or colloquial terms with synonyms, e.g., replacing "besties" with "best friends." In another example, the query processor 410 may remove extraneous words that impact the scope of the request but do not adjust the request itself, e.g., removing "every" from "every quote." In yet another example, the query processor 410 may perform corrections to the query 402 such as correcting incorrect terms that are included in a query based on the user's speech inflections, e.g., adjusting "qutes" to "quotes.

The classification module 420 receives the processed query 406 and performs a semantic analysis using dictionary data 420A to identify a set of classification indexes 409 based on processing different portions of the processed query. For example, the classification module 420 processes portion 408A to identify an intent associated with the voice query. In this example, the portion 408A indicates that there is nothing in the request that indicates that the user 102 wants to access anything other than content written by atheists, which includes quotes in articles. The portion 408B indicates that the user 102 is interested in accessing "POPULAR" quotes since the term "GREAT" is ambiguous in the context of the request provided. The portion 408C, as adjusted in the processed query 406, indicates that the online resources from which information should be retrieved are "WEBSITES." The portions 408D and 408E indicates that the information to be retrieved should have an "AUTHOR" that is associated with the noun "AETHIEST," or simply, authors that are atheists.

The query constructor 430 receives the classification indices 412 and uses them to construct an access query 414. The access query 414 is used to search the structured text repository 128 and retrieve text segments that are responsive to the access query 414. The access query 414 can be constructed using the classification indices 412 such that minimal filtering and/or processing of the retrieved text segments are necessary in order to be responsive to the request for information included in the voice query 402. For example, as shown in FIG. 4, the access query 414 specifies three conditions. The first condition is that retrieved text segments must be classified as quotes. The second condition is that the retrieved text segments be associated with an author that is identified has being an atheist. The third condition specifies a sorting order whereby text segments that are identified as being the most popular are listed before text segments that are identified as being less popular, e.g., based on the number of times a text segment has been access by users through the text segment repository.

The content extractor 440 uses the access query 414 to access the repository 128. In accessing the text repository 128, the content extractor 440 uses the classification indices 412 are used as search indices to, for example, improve the speed associated with extracting text segments that likely satisfy the conditions specified within the access query 414. As discussed above, because the repository 128 stores text segments with assigned classification labels within an associated structure, e.g., classification structure 300 depicted in FIG. 3, text segments that satisfy multiple conditions specified by the access query 414 can be retrieved. The content extractor 440 combines the retrieved text segments into a data package that includes accessed content 416.

In some implementations, the content extractor 440 may be capable of using the same access techniques to access other types of repositories that store data associated with text segments stored within the repository 128. For example, the content extractor 440 can additionally, or alternatively, access the stored metadata 132 depicted in FIG. 1A, the document repository 126 depicted in FIG. 1B, or other collections of online resources. In some implementations, the content extractor 440 may standardize the access query 414 and perform a web-based search using, for example, a search engine.

The response generator 450 receives the accessed content 416 and generates a query response 160 to provide for output to the user 102 in response to receiving the query 402. In the example depicted in FIG. 4, the query response 160 includes a list that identifies metadata associated with text segments that are determined to satisfy the conditions specified by the access query 414. The query response 160 identifies a first authored work "THE CASE AGAINST FAITH" authored by "JOHN SMITH," and a second authored work "EVOLUTION IS REAL" authored by "WALTER ROGERS." In this example, the first authored work is determined to be more popular than the second authored work, which results in the user 102 being presented with it first.

The authored works included within the query response 160 can be identified in numerous ways. In some implementations, the response generator 450 accumulates the text segments identified within the accessed content 416 to identify a document that includes the greatest number of text segments that are also included in the accessed content 416. In such implementations, the document is inferred by the response generator 450 to be the most relevant to the query 402. Alternatively, in other implementations, the query response generator 450 may accumulate the text segments included within the accessed content 416 using other types of indexes, e.g., author, online resource, genre, etc.

Figure 5A:
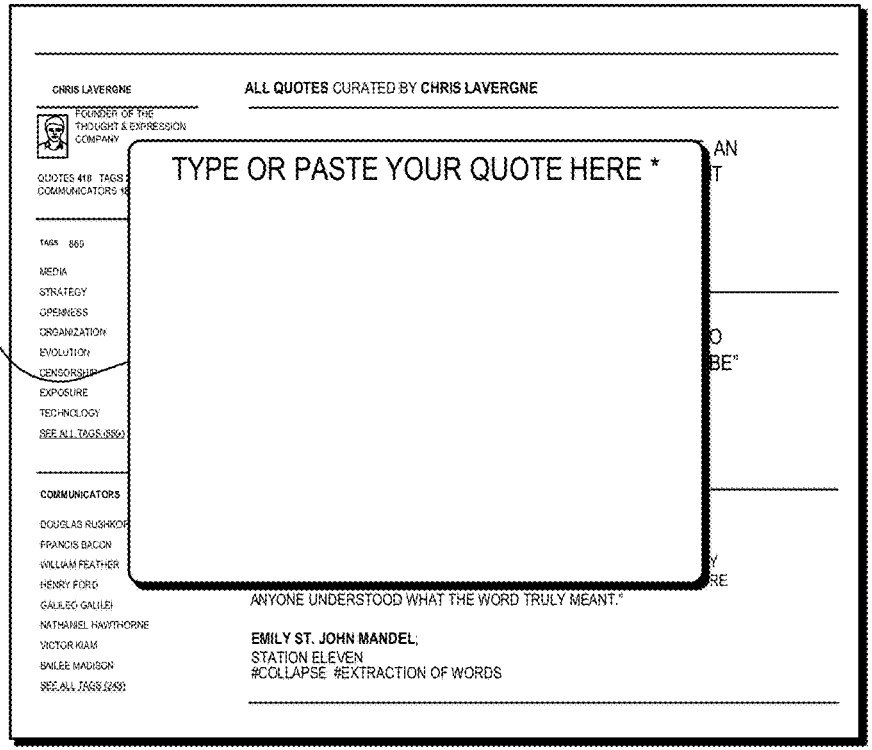
FIGS. 5A-5B are schematic diagrams that illustrate examples of interfaces that can be used by a user to store and access text segments that are indexed within a user-specific text repository.
Figure 5A:
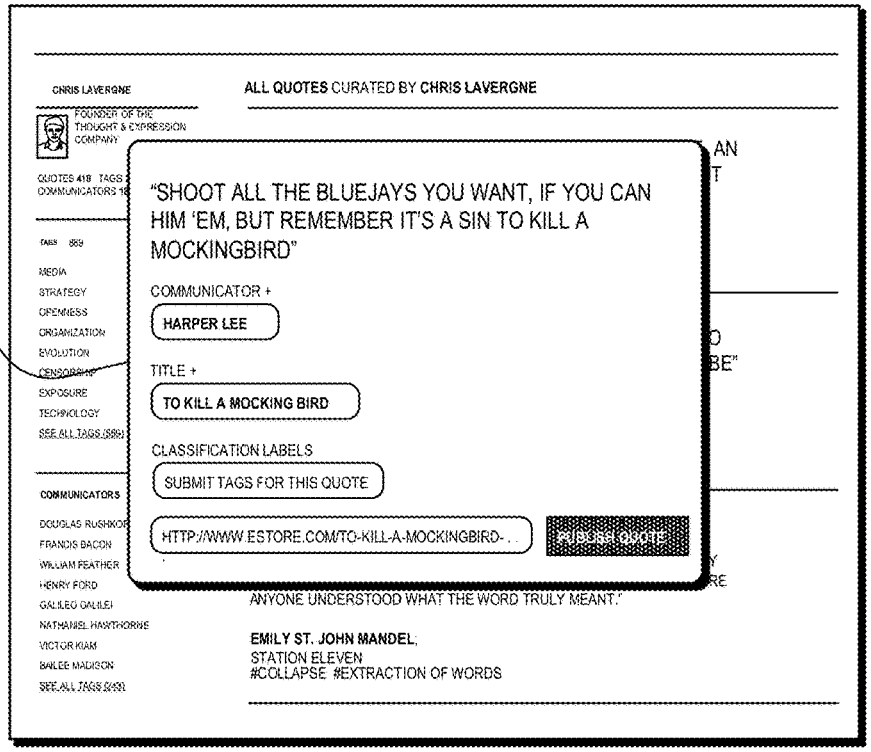
Figure 5B:

FIGS. 5A-5B illustrate examples of interfaces that can be used to access a collection of quotes indexed for a user. FIG. 5A illustrates examples of user interfaces 510A and 510B can be used to publish a new quote within the collection of quotes. FIG. 5B illustrates an example of a user interface 520 for automatically organizing individual quotes using a customized classification.

Referring initially to FIG. 5A, a user may initially copy or paste a text segment corresponding to a new text segment to publish. In some instances, the input text segment can correspond to the query 104A as discussed above. The interface 510B can be presented to the user in response to receiving the input text segment. As depicted, the interface 510B automatically obtains metadata associated with a source digital object that includes the quote (e.g., communicator, title). The interface 510B also obtains a web location associated with the source digital object (e.g., URL associated with an electronic store where the digital object can be available for purchase). As discussed above, in some instances, the URL can be identified based on a copy and paste command where the user copies a piece of text from a digital object obtained from a particular electronic content store.

The interface 510B also provides a text field for the user to specify a set of classification labels to organize the quote within the quote repository 128. In some implementations, the interface 510B provides a set of recommended classification labels based on the data stored within the quote repository 128, or user-specific data associated with the user's collection of quotes. In one example, individual terms within the submitted text segment can be analyzed by the natural language processor 154 and compared against other terms included within pre-existing quotes stored within the quote repository 128. The term comparator 152 may then identify a set of pre-existing quotes that are determined to be similar to the input text segment of quotes. The classification labels associated with these quotes can then be provided to the user as recommended classification labels. In another example, this technique can be performed with respect to the quotes that were specifically submitted by the user. In this example, the interface 510B may recommend classification labels that the user has frequently used in the past.

Referring now to FIG. 5B, an example of an interface 520 that can be used by a user to access text segments that are indexed within a user-specific text repository is depicted. In the example, a user van view all quotes that he/she has submitted to the system. The user can also filter the quotes that are displayed on the interface 520 using filters such as filter 522, which filters the quotes based on topic, and filter 524, which filters the quotes based on communicator. The filtering options that are displayed on the interface 520 can be generated based on the classification labels that are assigned to the quotes as discussed throughout.

Figure 6:
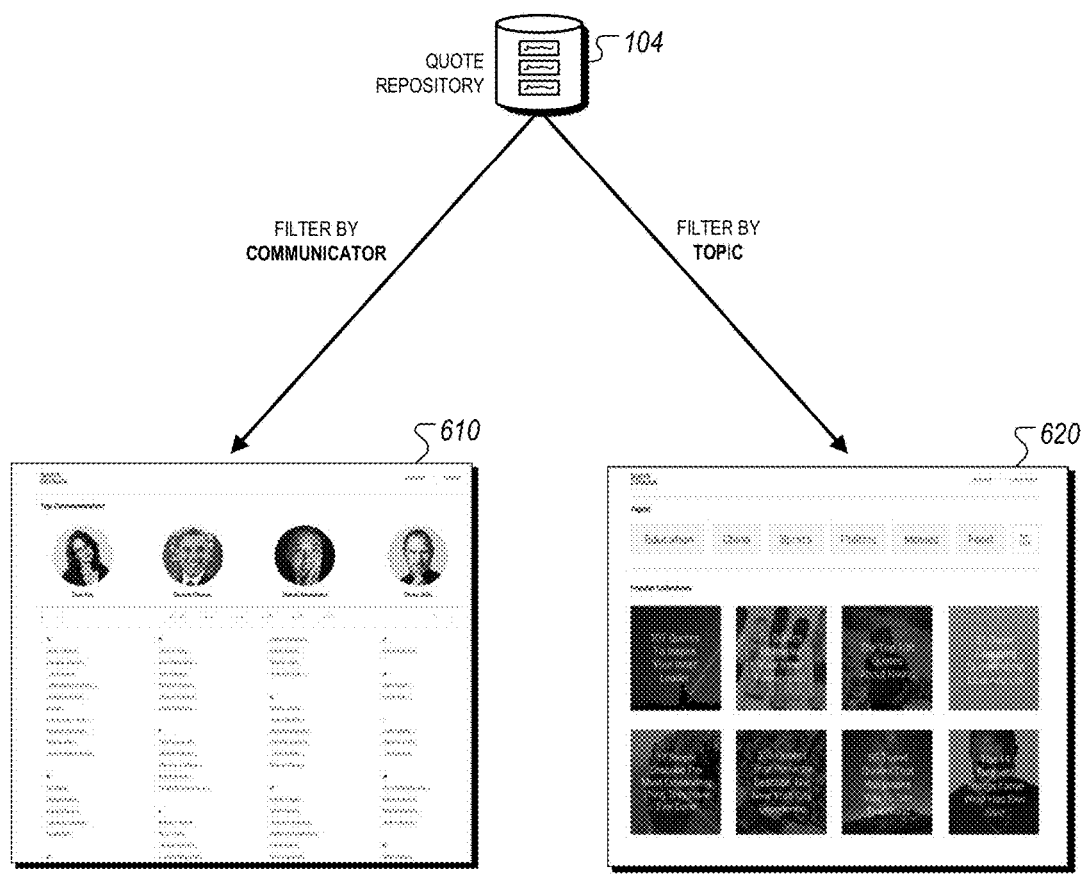
FIG. 6 is a schematic diagram that illustrates examples of filtering techniques that can be used to filter a text repository using different classification labels.

FIG. 6 is a schematic diagram that illustrates an example of filtering techniques that can be used to filter a text repository using different classification labels. For instance, a user may submit different search criteria in order to filter the collection of quotes that are included within the quote repository 128. In the first example, the user may filter the collection of quotes according to communicator using the interface 610. The interface 610 may organize the list of communicators in alphabetical order and after receiving a selection of a particular communicator on the interface 610, filter the collection of quotes by using the particular communicator as a search index. In the second example, the user may filter the collection of quotes according to topics using the interface 620. The interface 620 may organize the topics using the classification labels submitted by users associated with the system. In this example, quotes can be organized using crowd-sourced classifications that reflect how individual users have classified their personal collection of quotes using the classification labels.

Figure 7:
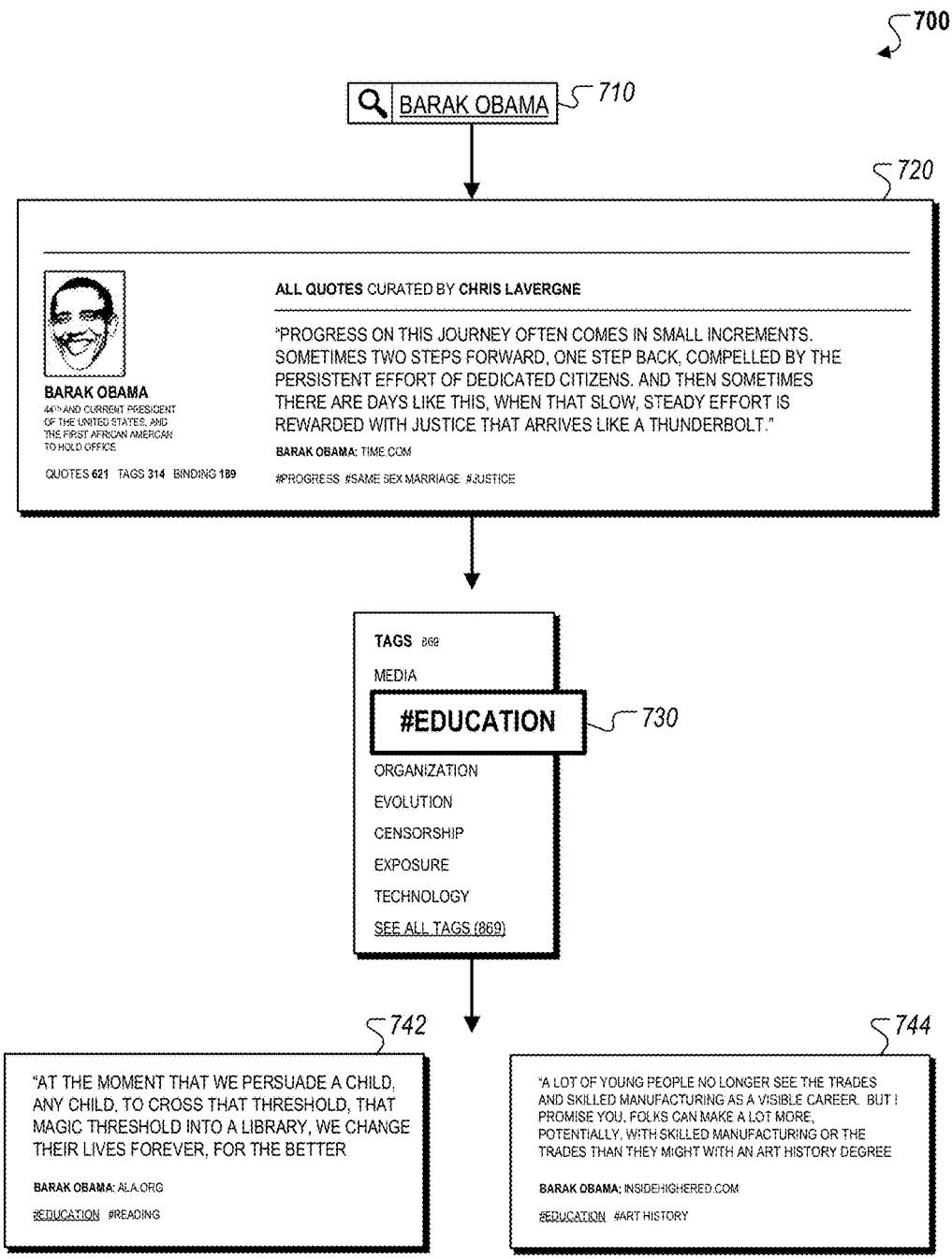
FIG. 7 is a schematic diagram that illustrates an example of a process for processing a search query to obtain relevant text segments within a structured text repository.

FIG. 7 is a schematic diagram that illustrates an example of a process for processing a search query to obtain relevant text segments within the structured text repository 128. In the example depicted, a user may initially submit a search query 710 that includes the terms "BARAK OBAMA." In response, the interface may filter the quote repository 128 using the search query terms. In the example, the search query terms can be compared against the communicator label of the collection of quotes and the quotes that are identified to have Barak Obama as a communicator are then selected and provided for display on the interface 720. The interface 720 represents a collection of quotes that are specifically organized and sourced for a particular communicator (e.g., Barak Obama). For example, the interface 720 provides the user with a list of individual quotes that have been previously indexed for the particular communicator, a source digital object associated with the quote (e.g., Time.com), and a hyperlink that, when enabled by the user, redirects the user to the web location associated with the source digital object. In this regard, the interface 720 can be used by a user to quickly filter the repository of quotes by a particular communicator and access relevant sources of information that are uniquely related to the particular communicator.

Once on the interface 720, the user may further refine the search criteria by filtering all quotes associated with the particular communicator by specific topics corresponding to individual classification labels that were previously submitted by users. For example, the user may select the classification label 730, which then narrows the list of displayed quotes to quotes that were communicated by Barak Obama and related in some way to education. In the examples depicted, quotes 742 and 744 represent examples of quotes that satisfy the filtering criteria submitted by the user. In addition to making quotes of a specific interest more easily accessible, the system also provides alternative classification labels that are also associated with the identified quote. For example, the quote 742 is identified as being associated with "#READING," whereas the quote 744 is identified as being associated with "#ART HISTORY." The quotes 742 and 744 further identify the respective source digital objects that include the quote (e.g., ALA.ORG, INSIDEHIRED.COM), and can provide hyperlinks that redirect the user to the web location associated with the source digital objects.

Figure 8:
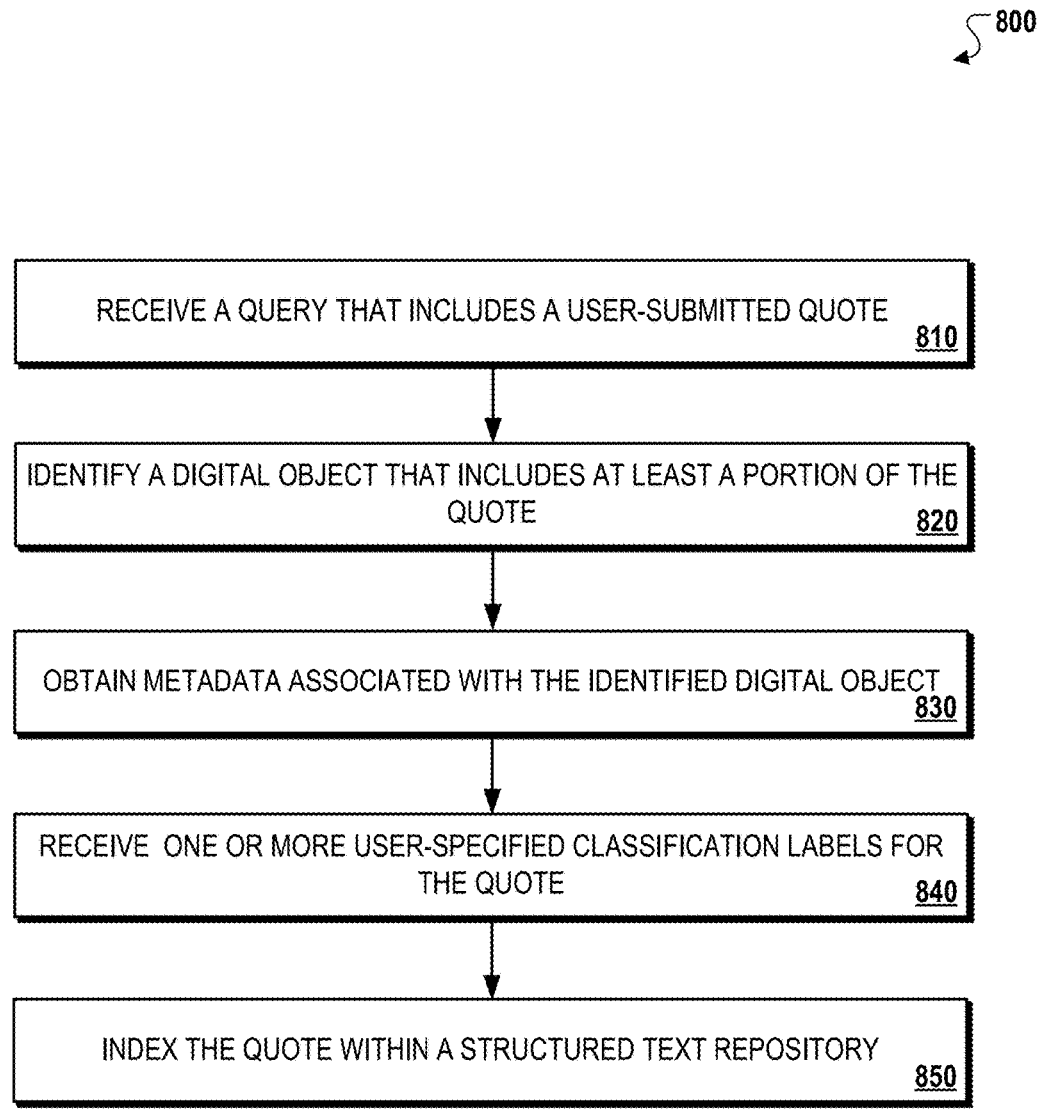
FIG. 8 is a flowchart that illustrates an example of a process for indexing user-submitted quotes within a structured text repository.

FIG. 8 is a flowchart that illustrates an example of a process 800 for indexing user-submitted quotes within a structured text repository. Briefly, the process 800 may include receiving a query that includes a user-submitted quote (810), identifying a digital object that includes at least a portion of the quote (820), obtaining metadata associated with the identified digital object (830), receiving one or more user-specified classification labels for the quote (840), and indexing the quote within a structured text repository (850).

In more detail, the process 800 may include receiving a query that includes a quote (810). For instance, the computing device 110 may receive data indicating the query 104A that includes a text segment from the user 102. As discussed above, in some instances, the received query can be a submission to add a new quote to the quote repository 128. For example, the user 102 may use the interface 510A to submit the query 104A. In some instances, the user 102 may type out the text segment into the text field provided within the interface 510A. In other instances, the user 102 may submit a copy-and-paste command to paste a quote from another electronic source digital object.

The process 800 may include identifying a digital object that includes at least a portion of the quote (820). For instance, the document identifier 150 may identity the source digital object 106 that includes at least a portion of the text segment that is included within the query 104A. As discussed above, in some instances, the source document 106 can be identified by comparing the individual terms and the arrangement of terms within the query 104A to the respective terms and arrangements of terms for individual digital objects within the collection of documents within the digital library 126. For instance, the natural language processor 154 may identify similarities between the query 104A and text extracted from each of the digital objects in order to automatically identify the source digital object 106 from among the collection of digital objects 126. In other instances, if the query 104A is a paste command from a source digital object associated with an electronic content store, then identifying information obtained from the electronic content store can be used to identify the source digital object 106.

The process 800 may include obtaining metadata associated with the identified digital object (830). For instance, after identifying the source digital object 106 that includes at least a portion of the query 104A, the metadata extractor 160 may obtain the metadata 108 that is associated with the source digital object 106. In some instances, the metadata 108 can be extracted directly from the digital library 126. In other instances, the metadata 108 may instead be extracted from the content server 130 that is associated with an electronic content store where the source digital object 126 is available for purchase. In such instances, the metadata 108 is extracted from the stored metadata 132 available on the content server 130.

The process 800 may include receiving one or more user-specified classification labels for the quote (840). For instance, after obtaining the metadata 108 associated with the source digital object 106, the indexing module 140 may then receive a set of user-defined classification labels 104B that identify a topic associated with the quote within the query 104A. As discussed above, the user 102 may use the interface 510B to submit a list of classification labels once the metadata 108 is viewable to the user 102.

In some implementations, the system can be capable of comparing the terms associated with the text query 104A to the terms included within other pre-existing quotes included within the quote repository 128 in order to automatically identify quotes that are determined to be similar to the quote associated with the query 104A. In such implementations, the system may recommend a set of classification labels to the user based on obtaining the classification labels that are already associated with the pre-existing quotes that are determined to be similar to the quote associated with the query 104A.

The process 800 may include indexing the quote within a structured text repository (850). For instance, the indexing module 140 may index the text segment included within the query 104A using the user-defined classification labels 104A according to a predetermined classification associated with the user 102 and store the text segment within the query 104A as a new quote 142 within the quote repository 128. The new quote 142 can be stored as a new database record that identifies the text segment associated with the quote, the metadata 108 associated with the source digital object 106 that includes at least a portion of the text segment of the quote, and the user-defined classification labels 104B.

Figure 9:
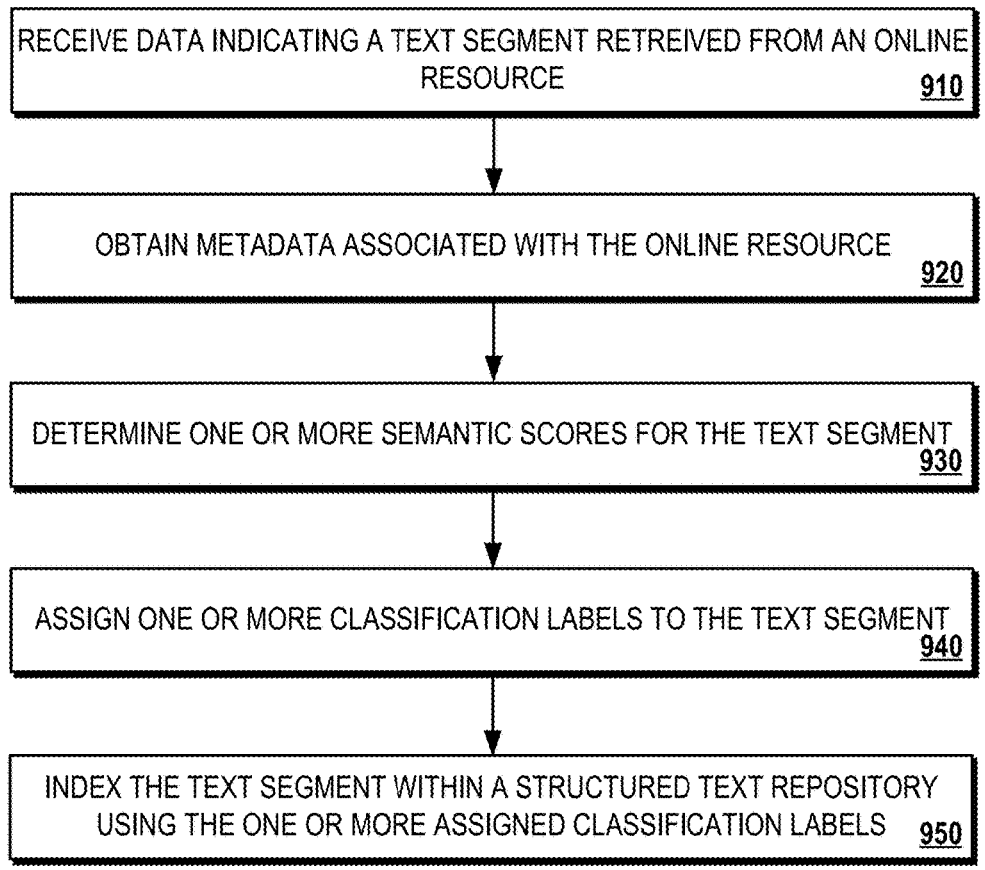
FIG. 9 is a flowchart that illustrates an example of a process for indexing user-submitted quotes within a structured text repository using classification labels.

FIG. 9 is a flowchart that illustrates an example of a process 900 for indexing text segments within a structured text repository using classification labels. Briefly, the process 900 can include the operations of receiving data indicating a text segment retrieved from an online resource (910), identifying metadata associated with the online resource (920), determining one or more semantic scores for the text segment (930), assigning one or more classification labels to the text segment (940), and indexing the segment within a structured text repository using the one or more assigned classification labels (950).

The process 900 is generally described in reference to the system 100A although other systems can also perform the operations of the process 900. In one example, the operations of the process 900 are performed exclusively by the application server 120 when indexing a new text segment that is submitted by the user into the repository 128. In another example, the operations of the process 900 are performed by a combination of the computing device 110, the application server 120, and the content server 130.

In detail, the process 900 can include the operation of receiving data indicating a text segment retrieved from an online resource (910). For example, the application server 120 can receive data indicating a text segment retrieved from an online resource. In the example depicted in FIG. 1B, the text segment is included in a query 104A that is provided by the user 102 through the computing device 110. The query 104A can be submitted through a mobile application running on the computing device 110 or alternatively, through a webpage presented on a browser running on the computing device 110. The online resource can represent a document, e.g., an electronic book, a webpage, e.g., an electronic article, a content store, e.g., a product page for an electronic book that includes the text segment, or some other web-based location from which the text segment is retrieved.

The text segment can be retrieved manually, e.g., based on a copy and paste commands provided by the user on the network resource, or automatically, e.g., without human intervention. In the first instance, the text segment can be retrieved when the user is submitting a new text segment to add to his/her personalized collection as depicted in the example in FIG. 5A. In the second instance, the text segment can be retrieved based on extracting text from the online resource.

The process 900 can include the operation of obtaining metadata associated with the online resource (920). For example, the application server 120 can access the content server 160 to obtain metadata associated with the online resource that includes the received text segment. In some instances, the application server 120 may process the text within the text query to automatically identify an online resource the includes the received text segment. For example, as depicted in FIG. 5A, the application server 120 may automatically identify metadata of a digital literary object, such as an author of the digital literary object and a title of the literary object, based on a text segment that a user pastes into a text field. Alternatively, in other instances, the application server 120 may identify the online resource based on user input provided by the user, e.g., a user input indicating information for the digital literary object.

The process 900 can include the operation of determining one or more semantic scores for the text segment (930). For example, the application server can determine one or more semantic scores for the text segment. As depicted in FIG. 2, the one or more semantic scores can include scores each represent an occurrence of a different part of speech included within the text segment, e.g., semantic scores 206A, scores that each represent an occurrence of a different syntactic term included within the text segment, e.g., semantic scores 206B, or scores that represent the occurrence of a special character or symbol within the text segment, e.g., semantic scores 206C.

The process 900 can include the operation of assigning one or more classification labels to the text segment (940). For example, the application server 120 can assign classification labels to the text segment based on the obtained metadata and the one or more determined semantic scores. In some implementations, the application server 120 assigns values to classification labels based on linguistic or syntactic attributes indicated by the one or more determined semantic scores and document attributes indicated within the obtained metadata. For example, as depicted in FIG. 2, the application server 120 assigns values to classification labels 208A-C based on the attributes of the text segment 201 identified within the metadata 202B and the text analysis data 206.

Alternatively, in some implementations, the application server 120 determines whether a particular classification label should be assigned to a text segment based on determining whether the attributes of the text segment satisfy a threshold similarity to a set of known attributes associated with the particular classification label. In such implementations, instead of assigning values to set of predetermined classification labels, the application server 120 makes predictive inferences as to whether a particular classification label accurately classifies a text segment given a set of attributes determined for the text segment, e.g., linguistic attributes, syntactic attributes, document attributes, and known attributes for the particular classification label.

In some implementations, the classification labels that are assigned to the text segment are specified within a hierarchal classification structure. For example, as depicted in FIG. 3, the hierarchal classification structure 300 includes classification labels 304, 306 and 316, which have values assigned to one hierarchal level, and classification hierarchies 308, 312, and 314 that have values assigned to multiple hierarchal levels. In addition, as discussed above with respect to FIG. 3, the classification labels assigned to the text segment can include document-based classification labels that are assigned based on attributes associated with the network resource that are indicated within the obtained metadata, and text-based classification labels that are assigned based on linguistic or syntactic attributes associated with the contents of the text segment.

The process 900 can include the operation of indexing the segment within a structured text repository using the one or more assigned classification labels (950). For example, the application server 120 can store the text segment within the structured text repository 128 using the classification labels assigned to the text segment. In some implementations, the text segment can be stored in a database record that identifies values of assigned classification labels as search indices. In such implementations, the information pertaining to the text segment can be retrieved from the database record within the structured text repository 128 when an access query identifying the values of the assigned classification labels is run. For example, as depicted in FIG. 4, a text segment stored within the structured text repository 128 can be determined to be relevant to a search query 402 submitted by the user 102 based on one or more classification indices 412 matching the indices stored within its database record.

Figure 10:
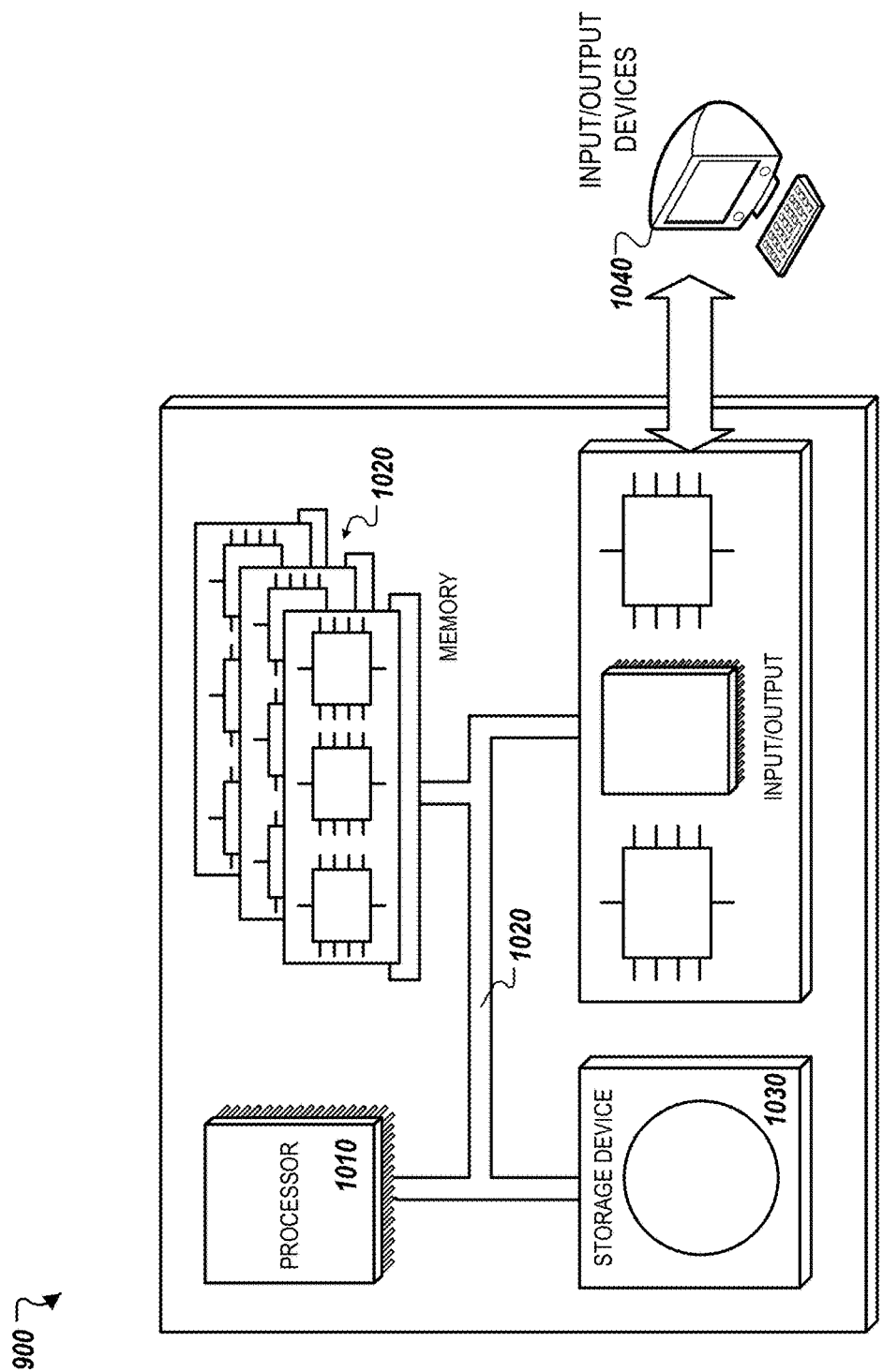
FIG. 10 is a schematic diagram that illustrates an example of a computer system that can be applied to any of the computer-implemented methods and other techniques described herein.

FIG. 10 illustrates a schematic diagram of a computer system 1000 that can be applied to any of the computer-implemented methods and other techniques described herein. The system 1000 can be used to carry out the operations described in association with any of the computer-implemented methods described previously, according to some implementations. In some implementations, computing systems and devices and the functional operations described in this specification can be implemented in digital electronic circuitry, in tangibly-embodied computer software or firmware, in computer hardware, including the structures disclosed in this specification (e.g., system 1000) and their structural equivalents, or in combinations of one or more of them. The system 1000 is intended to include various forms of digital computers, such as laptops, desktops, workstations, personal digital assistants, servers, blade servers, mainframes, and other appropriate computers, including vehicles installed on base units or pod units of modular vehicles. The system 1000 can also include mobile devices, such as personal digital assistants, cellular telephones, smartphones, and other similar computing devices. Additionally, the system can include portable storage media, such as, Universal Serial Bus (USB) flash drives. For example, the USB flash drives may store operating systems and other applications. The USB flash drives can include input/output components, such as a wireless transmitter or USB connector that can be inserted into a USB port of another computing device.

The system 1000 includes a processor 1010, a memory 1020, a storage device 1030, and an input/output device 1040. Each of the components 1010, 1020, 1030, and 1040 are interconnected using a system bus 1040. The processor 1010 is capable of processing instructions for execution within the system 1000. The processor can be designed using any of a number of architectures. For example, the processor 1010 can be a CISC (Complex Instruction Set Computers) processor, a RISC (Reduced Instruction Set Computer) processor, or a MISC (Minimal Instruction Set Computer) processor.

In one implementation, the processor 1010 is a single-threaded processor. In another implementation, the processor 1010 is a multi-threaded processor. The processor 1010 is capable of processing instructions stored in the memory 1020 or on the storage device 1030 to display graphical information for a user interface on the input/output device 1040.

The memory 1020 stores information within the system 1000. In one implementation, the memory 1020 is a computer-readable medium. In one implementation, the memory 1020 is a volatile memory unit. In another implementation, the memory 1020 is a non-volatile memory unit.

The storage device 1030 is capable of providing mass storage for the system 1000. In one implementation, the storage device 1030 is a computer-readable medium. In various different implementations, the storage device 1030 can be a floppy disk device, a hard disk device, an optical disk device, or a tape device.

The input/output device 1040 provides input/output operations for the system 1000. In one implementation, the input/output device 1040 includes a keyboard and/or pointing device. In another implementation, the input/output device 1040 includes a display unit for displaying graphical user interfaces.

Various implementations of the systems and methods described here can be realized in digital electronic circuitry, integrated circuitry, specially designed ASICs (application specific integrated circuits), computer hardware, firmware, software, and/or combinations of such implementations. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device, e.g., magnetic discs, optical disks, memory, Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device, e.g., a CRT (cathode ray tube) or LCD (liquid crystal display) monitor for displaying information to the user and a keyboard and a pointing device, e.g., a mouse or a trackball by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The systems and techniques described here can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the systems and techniques described here, or any combination of such back end, middleware, or front end components. The components of the system can be interconnected by any form or medium of digital data communication, e.g., a communication network. Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications can be made without departing from the spirit and scope of the invention. In addition, the logic flows depicted in the figures do not require the particular order shown, or sequential order, to achieve desirable results. In addition, other steps can be provided, or steps can be eliminated, from the described flows, and other components can be added to, or removed from, the described systems. Accordingly, other embodiments are within the scope of the following claims.

What is claimed is:

1. A method performed by one or more computers, the method comprising: receiving data indicating a text segment retrieved from an online resource; obtaining metadata associated with the online resource; determining one or more semantic scores for the text segment, wherein the one or more semantic scores for the text segment comprises one or more scores that each represents an occurrence of a different part of speech included within the text segment;
   assigning one or more classification labels to the text segment based at least on the obtained metadata and the one or more determined semantic scores, wherein the one or more classification labels that are assigned to the text segment comprises: a safety indicator that represents an explicitness of the text segment; one or more usage classifications that each represents a type of content represented by the online resource; and a duration metric representing a predicted duration of time during which the online resource is predicted to be accessed by a threshold number of users; and indexing, using the one or more assigned classification labels, the text segment within a text repository.

2. The method of claim 1, wherein the text segment comprises a quote retrieved from a digital literary object associated with the online resource.

3. The method of claim 2, wherein the metadata associated with the online resource comprises:
   a communicator of the digital literary object, and
   a title associated with the digital literary object.

4. The method of claim 1, wherein the one or more semantic scores for the text segment comprises one or more scores that each represent an occurrence of a different syntactic term included within the text segment.

5. The method of claim 1, further comprising:
   receiving, from a computing device, data indicating one or more user-defined classification labels specified for the text segment; and
   wherein the one or more classification labels that are assigned to the text segment comprises at least one of the one or more user-defined classification labels.

6. The method of claim 1, further comprising:
   obtaining data indicating a set of predetermined classification labels;
   determining that one or more predetermined classification labels from among the set of predetermined classification labels are relevant to the text segment based at least on the one or more semantic scores and the metadata associated with the online resource that includes the text segment; and
   wherein the one or more classification labels that are assigned to the text segment comprises at least one of the one or more predetermined classification labels that are determined to be relevant to the text segment.

7. The method of claim 1, further comprising:
   comparing terms included in the text segment to terms included in respective digital objects within a collection of stored digital objects; and
   determining that at least one digital object within the collection of stored digital objects includes a threshold number of terms that are included in the text segment.

8. The method of claim 1, wherein:
   the one or more classification labels that are assigned to the text segment are specified within a hierarchal classification structure; and
   the hierarchal classification structure comprises (i) a first set of classification labels that each indicate a linguistic attribute associated with a predicted syntax of the text segment, and (ii) for each classification label included within the first set of labels, respective subsets of classification labels that each indicate an alternative value for the linguistic attribute associated with a particular classification label included within the first set of labels.

9. A system comprising: one or more computers; and one or more storage devices storing instructions that, when executed by the one or more computers, cause the one or more computers to perform operations comprising: receiving data indicating a text segment retrieved from an online resource; obtaining metadata associated with the online resource; determining one or more semantic scores for the text segment, wherein the one or more semantic scores for the text segment comprises one or more scores that each represents an occurrence of a different part of speech included within the text segment; assigning one or more classification labels to the text segment based at least on the obtained metadata and the one or more determined semantic scores, wherein the one or more classification labels that are assigned to the text segment comprises: a safety indicator that represents an explicitness of the text segment; one or more usage classifications that each represents a type of content represented by the online resource; and a duration metric representing a predicted duration of time during which the online resource is predicted to be accessed by a threshold number of users; and indexing, using the one or more assigned classification labels, the text segment within a text repository.

10. The system of claim 9, wherein the text segment comprises a quote retrieved from a digital literary object associated with the online resource.

11. The system of claim 10, wherein the metadata associated with the online resource comprises:
   a communicator of the digital literary object, and
   a title associated with the digital literary object.

12. A non-transitory computer-readable storage device encoded with computer program instructions that, when executed by one or more computers, cause the one or more computers to perform operations comprising: receiving data indicating a text segment retrieved from an online resource; obtaining metadata associated with the online resource; determining one or more semantic scores for the text segment, wherein the one or more semantic scores for the text segment comprises one or more scores that each represents an occurrence of a different part of speech included within the text segment; assigning one or more classification labels to the text segment based at least on the obtained metadata and the one or more determined semantic scores, wherein the one or more classification labels that are assigned to the text segment comprises: a safety indicator that represents an explicitness of the text segment; one or more usage classifications that each represents a type of content represented by the online resource; and a duration metric representing a predicted duration of time during which the online resource is predicted to be accessed by a threshold number of users; and indexing, using the one or more assigned classification labels, the text segment within a text repository.

13. The non-transitory computer-readable storage device of claim 12, wherein the text segment comprises a quote retrieved from a digital literary object associated with the online resource.

14. The non-transitory computer-readable storage device of claim 13, wherein the metadata associated with the online resource comprises:
   a communicator of the digital literary object, and
   a title associated with the digital literary object.

15. The non-transitory computer-readable storage device of claim 12, wherein the one or more semantic scores for the text segment comprises one or more scores that each represent an occurrence of a different syntactic term included within the text segment.

* * * * *

UNITED STATES PATENT AND TRADEMARK OFFICE
CERTIFICATE OF CORRECTION

PATENT NO. : 10,515,125 B1  
APPLICATION NO. : 15/660645  
DATED : December 24, 2019  
INVENTOR(S) : Christopher E. Lavergne Page 1 of 1

It is certified that error appears in the above-identified patent and that said Letters Patent is hereby corrected as shown below:

On the Title Page

Item (57), (Abstract), Line 7, delete "One or more one or more" and insert -- One or more --, therefor.

Signed and Sealed this  
Ninth Day of June, 2020

Andrei Iancu  
*Director of the United States Patent and Trademark Office*